United States Patent
Luick

(10) Patent No.: US 6,763,421 B2
(45) Date of Patent: Jul. 13, 2004

(54) INSTRUCTION PAIR DETECTION AND PSEUDO PORTS FOR CACHE ARRAY

(75) Inventor: David Arnold Luick, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 344 days.

(21) Appl. No.: 09/975,405

(22) Filed: Oct. 11, 2001

(65) Prior Publication Data

US 2003/0074532 A1 Apr. 17, 2003

(51) Int. Cl.$^7$ .................................................. G06F 12/00
(52) U.S. Cl. ............................... 711/3; 711/5; 711/126; 711/140
(58) Field of Search ............................... 711/3, 5, 123, 711/126, 140, 125, 168, 169

(56) References Cited

U.S. PATENT DOCUMENTS

| | | | |
|---|---|---|---|
| 5,559,986 A | * | 9/1996 | Alpert et al. |
| 5,794,003 A | * | 8/1998 | Sachs |
| 5,924,117 A | | 7/1999 | Luick .................. 711/127 |
| 6,230,260 B1 | | 5/2001 | Luick .................. 712/239 |
| 6,279,101 B1 | * | 8/2001 | Witt et al. |
| 6,363,475 B1 | * | 3/2002 | Dowling |

* cited by examiner

Primary Examiner—Jack A. Lane
(74) Attorney, Agent, or Firm—Moser Patterson & Sheridan LLP

(57) ABSTRACT

Embodiments are provided in which a first and second instructions are executed in parallel. A first and a second address are generated according to the first and second instructions, respectively. The first address is used to select a data cache line of a data cache RAM and a first data bank from the data cache line. The second address is used to select a second data bank from the data cache. The first and second data banks are outputted in parallel from the data cache RAM. An instruction pair testing circuit tests the probability of the first and second instructions accessing a same data cache line of the data cache RAM. If it is unlikely that the two instructions will access a same data cache line, the second instruction is refetched and re-executed, and the second data bank is not used.

20 Claims, 12 Drawing Sheets

| INPUTS | | | | | | OUTPUTS | | | | | | |
|---|---|---|---|---|---|---|---|---|---|---|---|---|
| LP$_{AB}$ | LP$_{AC}$ | LP$_{AD}$ | LP$_{BC}$ | LP$_{BD}$ | LP$_{CD}$ | AGEN$_A$ SELECT | AGEN$_B$ SELECT | AGEN$_C$ SELECT | AGEN$_D$ SELECT | PSEUDO PORT1 ACTIVE | PSEUDO PORT3 ACTIVE | INSTRUCTION REFETCH |
| 0 | 0 | 0 | 0 | 0 | 0 | 00 PORT0 | 10 PORT2 | 01 PORT1 | 11 PORT3 | 0 | 0 | 0011 (3 & 4) |
| 0 | 0 | 1 | 0 | 0 | 0 | 00 PORT0 | 10 PORT2 | 11 PORT3 | 01 PORT1 | 1 | 0 | 0001 (3) |
| 0 | 0 | 1 | 1 | 0 | 0 | 00 PORT0 | 10 PORT2 | 11 PORT3 | 01 PORT1 | 1 | 1 | 0000 (NONE) |
| 0 | 1 | 0 | 1 | 0 | 0 | 00 PORT0 | 10 PORT2 | 01 PORT1 | 11 PORT3 | 1 | 0 | 0001 (4) |
| 0 | 1 | 1 | 1 | 0 | 0 | 00 PORT0 | 10 PORT2 | 11 PORT3 | 01 PORT1 | 1 | 1 | 0000 (NONE) |

Fig. 5

INSTRUCTION PAIR DETECTION AND PSEUDO PORTS FOR CACHE ARRAY

BACKGROUND OF THE INVENTION

1. Field of the Invention

The invention generally relates to logic devices, and more particularly to cache subsystems that facilitate parallel execution of multiple instructions.

2. Description of the Related Art

Users of data processing systems such as computers and the like continue to demand greater and greater performance from such systems for handling increasingly complex and difficult tasks. Greater performance from the processors that operate such systems may be obtained through faster clock speeds, so that individual instructions are processed more quickly. However, relatively greater performance gains have been achieved through performing multiple operations in parallel with one another.

One manner of parallelization is known as "pipelining", where instructions are fed into a pipeline for an execution unit in a processor that performs different operations necessary to process the instructions in parallel. For example, to process a typical instruction, a pipeline may include separate stages for fetching the instruction from memory, executing the instruction, and writing the results of the instruction back into memory. Thus, for a sequence of instructions fed in sequence into the pipeline, as the results of the first instruction are being written back into memory by the third stage of the pipeline, a next instruction is being executed by the second stage, and still a next instruction is being fetched by the first stage. While each individual instruction may take several clock cycles to be processed, since other instructions are also being processed at the same time, the overall throughput of the processor is much greater.

Greater parallelization can also be performed by attempting to execute multiple instructions in parallel using multiple execution units in a processor. Processors that include multiple execution units are often referred to as "superscalar" processors, and such processors include scheduling circuitry that attempts to efficiently dispatch instructions to different execution units so that as many instructions are processed at the same time as possible. Relatively complex decision-making circuitry is often required, however, because often-times one instruction cannot be processed until after another instruction is completed. For example, if a first instruction loads a register with a value from memory, and a second instruction adds a fixed number to the contents of the register, the second instruction typically cannot be executed until execution of the first instruction is complete.

The use of relatively complex scheduling circuitry can occupy a significant amount of circuitry on an integrated circuit device, and can slow the overall execution speed of a processor. For these reasons, significant development work has been devoted to Very Long Instruction Word (VLIW) processors, where the decision as to which instructions can be executed in parallel is made when a program is created, rather than during execution. A VLIW processor typically includes multiple execution units, and each VLIW instruction includes multiple primitive instructions known as parcels that are known to be executable at the same time as one another. Each primitive instruction in a VLIW may therefore be directly dispatched to one of the execution units without the extra overhead associated with scheduling. VLIW processors rely on sophisticated computer programs known as compilers to generate suitable VLIW instructions for a computer program written by a computer user. VLIW processors are typically less complex and more efficient than superscalar processors given the elimination of the overhead associated with scheduling the execution of instructions.

Despite the type of processor, another bottleneck on computer performance is that of transferring information between a processor and memory. In particular, processing speed has increased much more quickly than that of main memory. As a result, cache memories, or caches, are often used in many such systems to increase performance in a relatively cost-effective manner.

A typical data cache subsystem comprises a data cache RAM (Random Access Memory), a cache directory RAM, bus buffers, and a cache controller. The data cache RAM is a small, fast memory which is used to store copies of data which could be accessed more slowly from main memory. The cache size is the number of bytes in the data cache RAM alone. The cache directory RAM contains a list of main memory addresses of data stored in corresponding locations of the data cache RAM. So, with each cache location, not only is data stored, but also is an address, making the combined directory and data cache RAMs behave like a single, wide memory. The bus buffers are controlled in such a way that if the cache can supply a copy of a main memory location (this is called a cache hit), then the main memory is not allowed to put its data onto the CPU's data pins. If the cache does not contain a copy of the data requested by the CPU (this is called a cache miss), the bus buffers allow the address issued by the CPU to be sent to the main memory. The cache controller implements the algorithm which moves data into and out of the data cache RAM and the cache directory RAM.

It is desirable to execute more than one instruction in parallel. However, executing more than one instruction in parallel requires more hardware. For instance, in a data cache subsystem, in order to execute two instructions in parallel, two data cache RAMs are required. The two addresses corresponding to the two instructions are applied to the two data cache RAMs. In response, each the two data cache RAMs supplies the requested data if there is a cache hit.

Therefore, there is a need for an apparatus and method that use N data cache RAMs but support the execution of up to M (M>N) instructions in parallel. However, there is still a probability that such a data cache subsystem can sometimes fail to support the execution of all M instructions in parallel. If so, one or more of the M instructions must be refetched and re-executed. Therefore, there is another need for an apparatus and method that involve a detection subsystem that can detect the likelihood of such failure as soon as possible so that the refetch and reexecution can be performed as soon as possible.

SUMMARY OF THE INVENTION

In an embodiment, a data cache subsystem is provided for providing data corresponding to a first and second addresses in parallel, the data cache subsystem comprising a data cache RAM including a plurality of data cache lines and data banks; and a bank selector circuit coupled to the data cache RAM, wherein the data cache RAM receives the first address and sends a data cache line selected by the first address to the bank selector circuit; the bank selector circuit receives the first address and outputs a first data bank selected by the first address from the data cache line; and the bank selector circuit receives the second address and outputs a second data bank selected by the second address from the data cache line.

In another embodiment, a method is provided for retrieving data from a data cache RAM corresponding to a first and second addresses in parallel, the method comprising using the first address to select a data cache line of the data cache RAM; outputting with a bank selector circuit a first data bank selected by the first address from the data cache line; and outputting with the bank selector circuit a second data bank selected by the second address from the data cache line.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 5 shows a truth table for implementing the AGEN Select Port & Restart Circuit 589 of FIG. 3 according to an embodiment.

DETAILED DESCRIPTION OF THE PREFERRED EMBODIMENTS

Embodiments are provided in which a first and second instructions are executed in parallel. A first and a second address are generated according to the first and second instructions, respectively. The first address is used to select a data cache line of a data cache RAM and a first data bank from the data cache line. The second address is used to select a second data bank from the data cache. The first and second data banks are outputted in parallel from the data cache RAM. An instruction pair testing circuit tests the probability of the first and second addresses accessing a same data cache line of the data cache RAM. If it is unlikely that the two instructions will access a same data cache line, the second instruction is refetched and re-execute, and the second data bank is not used.

Figure 1:
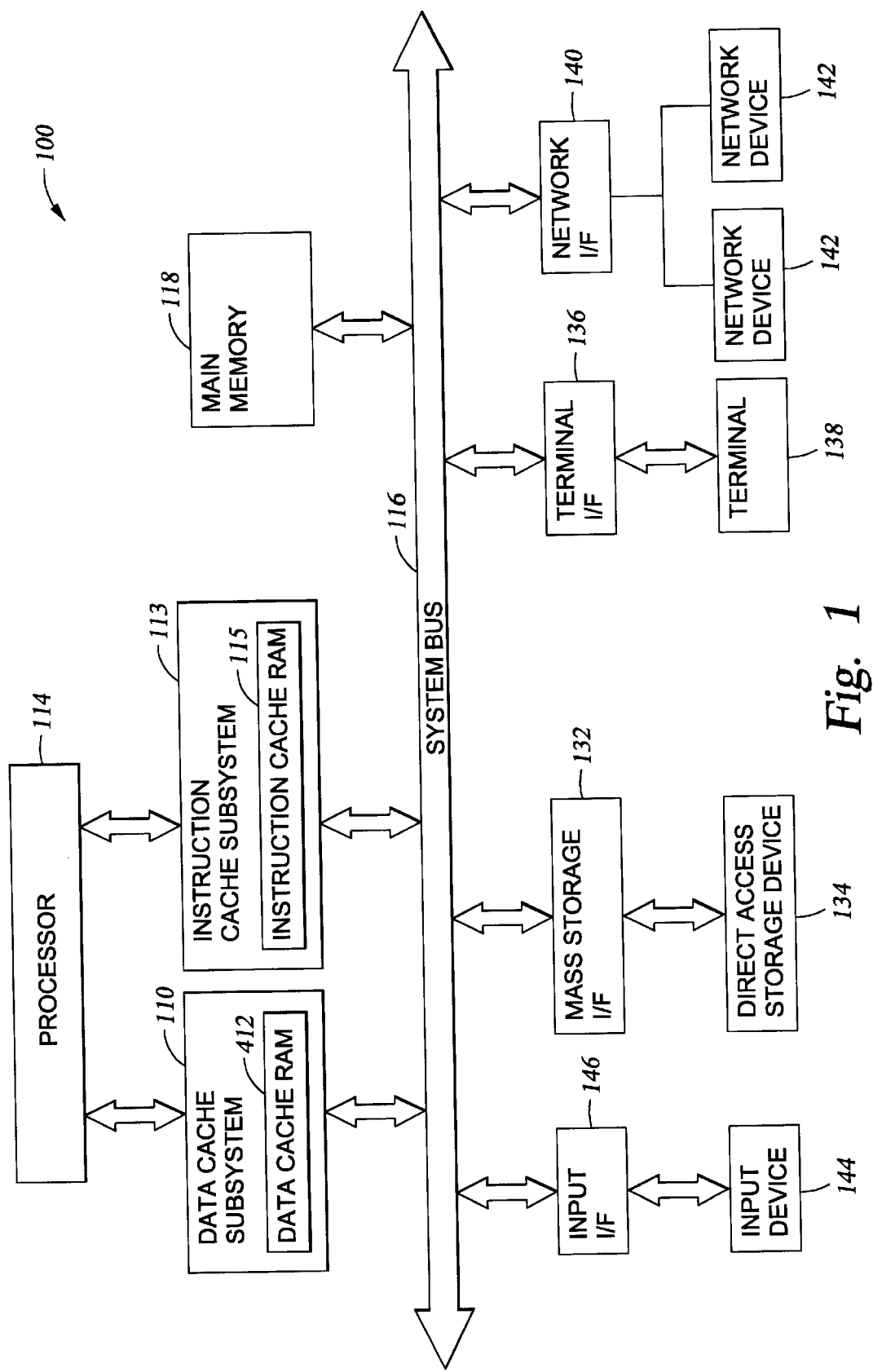
FIG. 1 shows a computer system 100 according to an embodiment.

FIG. 1 shows a computer system 100 according to an embodiment. Illustratively, the computer system 100 includes a system bus 116, at least one processor 114 coupled to the system bus 116 via a data cache subsystem 110 and an instruction cache subsystem 113. The data cache subsystem 110 includes a data cache RAM 412. The instruction cache subsystem 113 includes an instruction cache RAM 115. The computer system 100 also includes an input device 144 coupled to system bus 116 via an input interface 146, a storage device 134 coupled to system bus 116 via a mass storage interface 132, a terminal 138 coupled to system bus 116 via a terminal interface 136, and a plurality of networked devices 142 coupled to system bus 116 via a network interface 140.

Terminal 138 is any display device such as a cathode ray tube (CRT) or a plasma screen. Terminal 138 and networked devices 142 are desktop or PC-based computers, workstations, network terminals, or other networked computer systems. Input device 144 can be any device to give input to the computer system 100. For example, a keyboard, keypad, light pen, touch screen, button, mouse, track ball, or speech recognition unit could be used. Further, although shown separately from the input device, the terminal 138 and input device 144 could be combined. For example, a display screen with an integrated touch screen, a display with an integrated keyboard or a speech recognition unit combined with a text speech converter could be used.

Storage device 134 is DASD (Direct Access Storage Device), although it could be any other storage such as floppy disc drives or optical storage. Although storage 134 is shown as a single unit, it could be any combination of fixed and/or removable storage devices, such as fixed disc drives, floppy disc drives, tape drives, removable memory cards, or optical storage. Main memory 118 and storage device 134 could be part of one virtual address space spanning multiple primary and secondary storage devices.

The contents of main memory 118 can be loaded from and stored to the storage device 134 as processor 114 has a need for it. Main memory 118 is any memory device sufficiently large to hold the necessary programming and data structures of the invention. The main memory 118 could be one or a combination of memory devices, including random access memory (RAM), non-volatile or backup memory such as programmable or flash memory or read-only memory (ROM). The main memory 118 may be physically located in another part of the computer system 100. While main memory 118 is shown as a single entity, it should be understood that memory 118 may in fact comprise a plurality of modules, and that main memory 118 may exist at multiple levels, from high speed registers and caches to lower speed but larger DRAM chips.

Figure 2A:
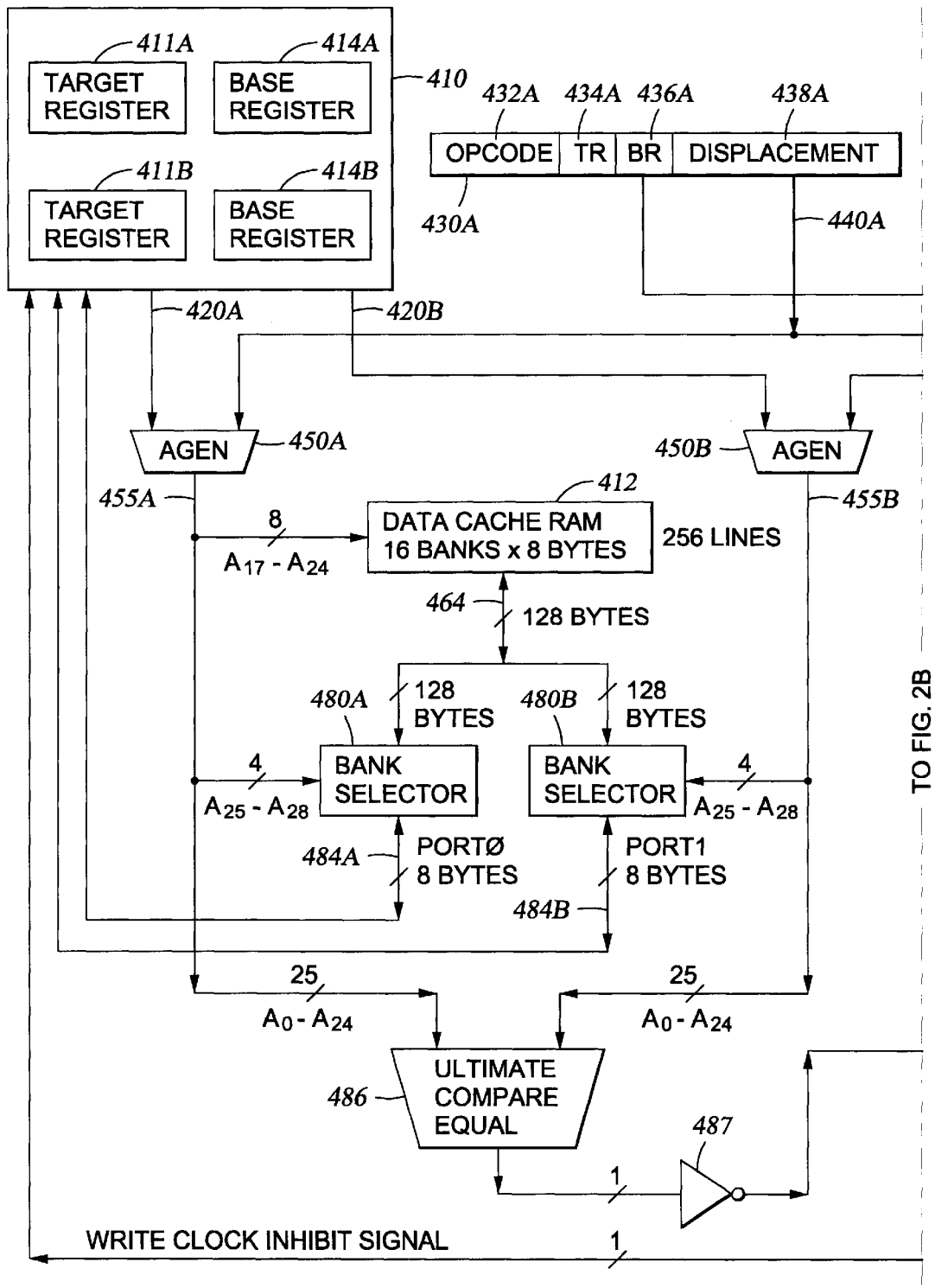
FIGS. 2A and 2B shows how the data cache RAM 412 of FIG. 1 connects and operates in conjunction with an Instruction Pair Testing Circuit 485.
Figure 2B:
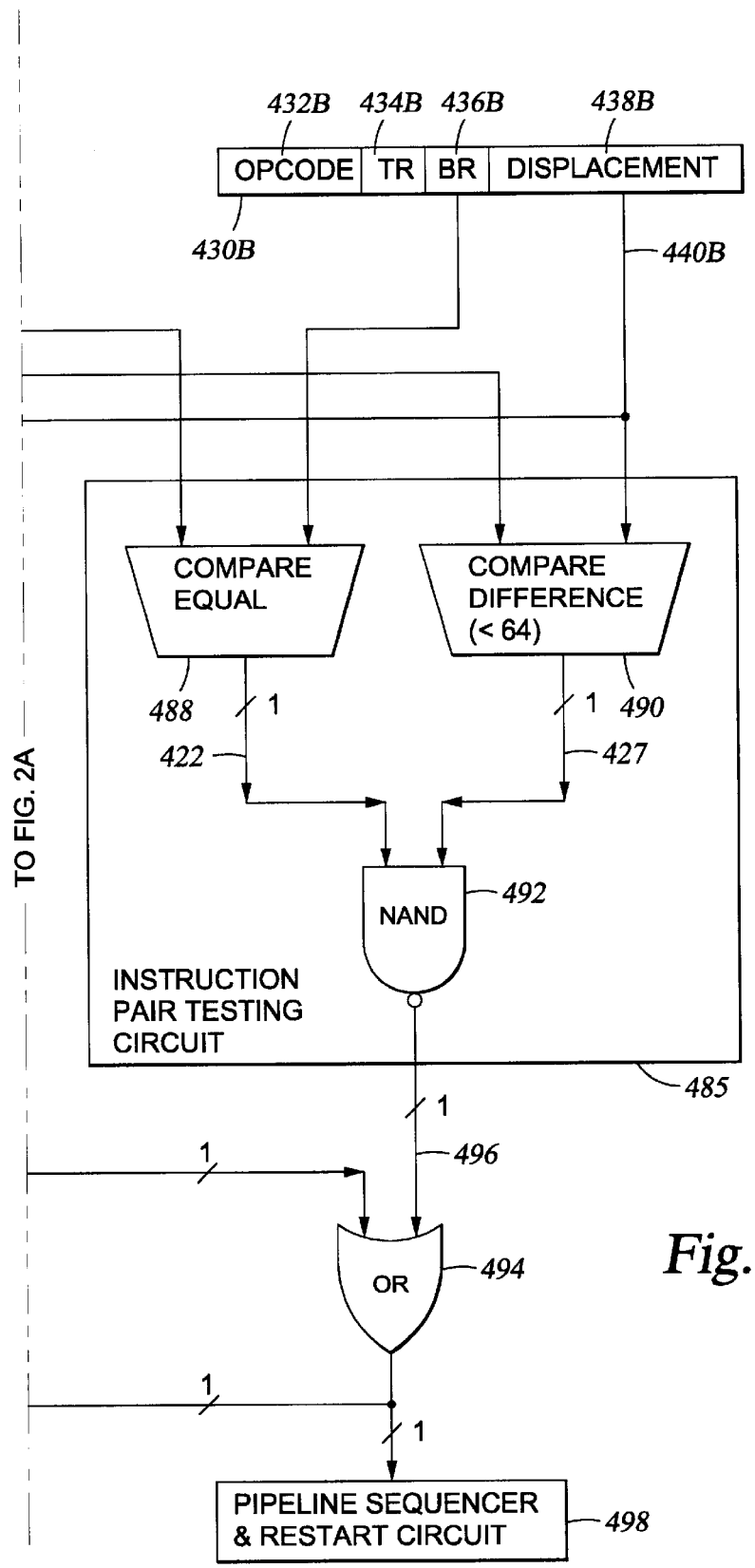

FIG. 2 shows how various components including the data cache RAM 412 of FIG. 1 connect and operate. The operation of the components of FIG. 2 is described assuming that a first and second load instructions are fetched into instruction registers 430A and 430B in parallel. The first and second load instructions, illustratively, have opcode fields 432A & 432B, target register fields 434A & 434B, base register fields 436A & 436B, and displacement fields 438A & 438B, respectively.

The execution of the first load instruction is discussed first. The opcode field 432A of the first load instruction specifies the operations which the processor 114 of FIG. 1 has to perform to load a first data from the main memory 118 of FIG. 1 to a register file 410. Register file 410 resides in the processor 114 of FIG. 1. The target register field 434A of the first load instruction specifies a first target register 411A in the register file 410 which will receive the first data to be loaded from the main memory 118 of FIG. 1.

The base register field 436A of the first load instruction specifies a first base register 414A in the register file 410 whose content will be used to calculate a first address, in the memory 118, of the first data. The displacement field 438A of the first load instruction and the content of the first base register 414A are added by an AGEN (Address Generation Circuit) 450A to generate the first address at output 455A of AGEN 450A. The first address, illustratively, has 32 bits $A_0$–$A_{31}$ in which $A_0$ is the most significant bit and $A_{31}$ is the least significant bit. The bits $A_{17}$–$A_{24}$ are applied to the data cache RAM (Random Access Memory) 412. The same reference numeral 412 is used in different figures to indicate the same component. The bits $A_{17}$–$A_{24}$ are used as a set address to select one of 256 cache lines of data cache RAM 412.

Illustratively, the selected cache line spreads across 16 banks of the data cache RAM 412. Each of the 16 banks has a size of 256×8 Bytes. It is assumed that there is a read hit. The entire selected cache line of 128 Bytes is outputted to output 464 which is then applied to two bank selectors 480A & 480B. The bits $A_{25}$–$A_{28}$ of the first address are applied to bank selector 480A to select one of the 16 banks of the selected cache line from output 464 which is then outputted to output 484A (port0). Port0 484A is considered a true port of the data cache RAM 412. The meaning of the term "true", as opposed to "pseudo", will become apparent when the pseudo port1 484B is described later. The data bank at output 484A is applied to the first target register 411A in the register file 410 which is specified by the target field 434A of the first load instruction.

The execution of the second load instruction is similarly carried out. The opcode field 432B of the second load instruction specifies the operations which the processor 114 of FIG. 1 has to perform to load a second data from the main memory 118 of FIG. 1 to the register file 410. The target register field 434B of the second load instruction specifies a second target register 411B in the register file 410 which will receive the second data to be loaded from the main memory 118 of FIG. 1.

The base register field 436B of the second load instruction specifies a second base register 414B in the register file 410 whose content will be used to calculate a second address, in the memory 118, of the second data. The displacement field 438B of the second load instruction and the content of the second base register 414B are added by an AGEN (Address Generation Circuit) 450B to generate the second address at output 455B of AGEN 450B. The second address, illustratively, has 32 bits $A_0$–$A_{31}$ in which $A_0$ is the most significant bit and $A_{31}$ is the least significant bit.

The bits $A_{25}$–$A_{28}$ of the second address are applied to bank selector 480B to select one of the 16 banks of the selected cache line at output 464 which is then outputted to output 484B. The data at output 484B is loaded to the second target register 411B in register file 410 which is specified by the target field 434B of the second load instruction.

The data at output 484B is from the same cache line as the data at output 484A. The data at output 484B is correct only if the first and second addresses at outputs 455A & 455B, respectively, have the same 25 most significant bits (i.e., bits $A_0$–$A_{24}$). This condition ensures that the first and second addresses at outputs 455A & 455B, respectively, have the same set address bits and the same tag address bits, and therefore, the corresponding first and second data come from the same cache line. This condition is likely to happen due to the well-known principle of locality which observes that computer codes tend to access a certain data cache interval repeatedly.

In an embodiment, to check this condition (i.e., the first and second addresses at outputs 455A & 455B, respectively, have the same 25 most significant bits (i.e., bits $A_0$–$A_{24}$), the bits $A_0$–$A_{24}$ of the first address and the bits $A_0$–$A_{24}$ of the second address are applied as two inputs to an Ultimate Compare Equal circuit 486 which outputs a "1" (logic HIGH) if its two inputs are equal and a "0" (logic LOW) if its two inputs are not equal. The output of the Ultimate Compare Equal circuit 486 is inverted by an inverter 487 and goes through an OR gate 494 to register file 410 as a Write Clock Inhibit signal and to a Pipeline Sequencer & Restart circuit 498. If the two inputs of the Ultimate Compare Equal circuit 486 are not equal, indicating the data at output 484B is not correct, the output of the Ultimate Compare Equal circuit 486 is LOW, causing the output of the OR gate 494 to go HIGH. As a result, the Write Clock Inhibit signal becomes active preventing the register file 410 from going further with the incorrect data from pseudo port1 484B. The output 484B (port1) is called a pseudo port because the data at port1 is sometimes incorrect. In contrast, the data at the true port0 484A is always correct. The output of the OR gate 494 going HIGH also triggers the Pipeline Sequencer & Restart circuit 498 to restart fetching and executing the second load instruction.

In an embodiment, to facilitate the detection of a high probability of the first and second addresses at outputs 455A & 455B not accessing a same data cache line of the data cache RAM 412, an Instruction Pair Testing circuit 485 is used. The Instruction Pair Testing circuit 485 receives inputs from the first and second instruction registers 430A & 430B. The Instruction Pair Testing circuit 485 generates as output a "1" (HIGH) signal to an output 496 to indicate that the first and second addresses at outputs 455A & 455B will unlikely access a same data cache line of the data cache RAM 412. The HIGH signal at output 496 goes through the OR gate 494 and triggers the Pipeline Sequencer & Restart circuit 498 to refetch the second load instruction. The HIGH signal at output 496 also activates the Write Clock Inhibit signal to prevent register file 410 from further processing the data from pseudo port1.

In an embodiment, the Instruction Pair Testing circuit 485 includes a Compare Equal circuit 488. The Compare Equal circuit 488 receives as its two inputs the base register field 436A of the first load instruction and the base register field 436B of the second load instruction. The Compare Equal circuit 488 generates to output 422 a "1" (HIGH) signal if its two inputs are equal and a "0" (LOW) signal if its two inputs are not equal. Because the contents of the first and second base registers 414A & 414B are used to calculate the first and second addresses, respectively, a LOW signal at output 422 indicates that the first and second addresses at outputs 455A & 455B will unlikely be equal. Therefore, a LOW signal at output 422 indicates the first and second addresses at outputs 455A & 455B will unlikely access a same data cache line of the data cache RAM 412.

The Instruction Pair Testing circuit 485 can also include a Compare Difference circuit 490. The Compare Difference circuit 490 receives as its two inputs the displacement field 438A of the first instruction and the displacement field 438B of the second instruction. The Compare Difference circuit 490 generates to an output 427 a "1" (logic HIGH) signal if the difference of its two inputs is, illustratively, less than 64, a constant, and a "0" (logic LOW) signal if the difference is greater than or equal to 64. A LOW signal at the output 427 indicates that the first and second addresses at outputs 455A & 455B will unlikely be equal. Therefore, a LOW signal at output 427 indicates that the first and second addresses at outputs 455A & 455B will unlikely access a same data cache line of the data cache RAM 412.

In an embodiment, the output 422 of the Compare Equal circuit 488 and the output 427 of the Compare Difference circuit 490 are applied to a NAND gate 492. An output of the NAND gate 492 is connected to the output 496 of the Instruction Pair Testing circuit 485. As a result, a HIGH signal at the output 496 of the Instruction Pair Testing circuit 485 indicating that the first and second addresses at outputs 455A & 455B will unlikely access a same data cache line of the data cache RAM 412 is generated whenever either the Compare Equal circuit 488 or the Compare Difference circuit 490 indicates the same thing (i.e., the first and second addresses at outputs 455A & 455B will unlikely access a same data cache line of the data cache RAM 412).

In another embodiment, the Instruction Pair Testing circuit 485 includes only Compare Equal circuit 488 and does not include the Compare Difference circuit 490 and the NAND gate 492. The output 422 of the Compare Equal circuit 488 is connected directly to the output 496 of the Instruction Pair Testing circuit 485.

In yet another embodiment, the Instruction Pair Testing circuit 485 includes only the Compare Difference circuit 490 and does not include the Compare Equal circuit 488 and the NAND gate 492. The output 427 of the Compare Difference circuit 490 is connected directly to the output 496 of the Instruction Pair Testing circuit 485.

Because the Instruction Pair Testing circuit 485 receives inputs from the instruction registers 430A & 430B, the Instruction Pair Testing circuit 485 generates an output signal at output 496 before the first and second addresses are generated. If a HIGH signal at the output 496 of the Instruction Pair Testing circuit 485 is generated, the Pipeline Sequencer & Restart circuit 498 will refetch the second instruction and the register 410 will not accept or process data from pseudo port1.

However, even if a LOW signal at the output 496 of the Instruction Pair Testing circuit 485 is generated, there is still a small probability that the two data addresses 455A & 455B do not have the same 25 most significant bits (i.e., bits $A_0$–$A_{24}$). The Ultimate Compare Equal circuit 486 recognizes such a condition and, with the help of the inverter 487 and the OR gate 494, ensures that the second load instruction will be refetched and re-execute. The operation of the Ultimate Compare Equal circuit 486 was discussed above.

Figure 3A:
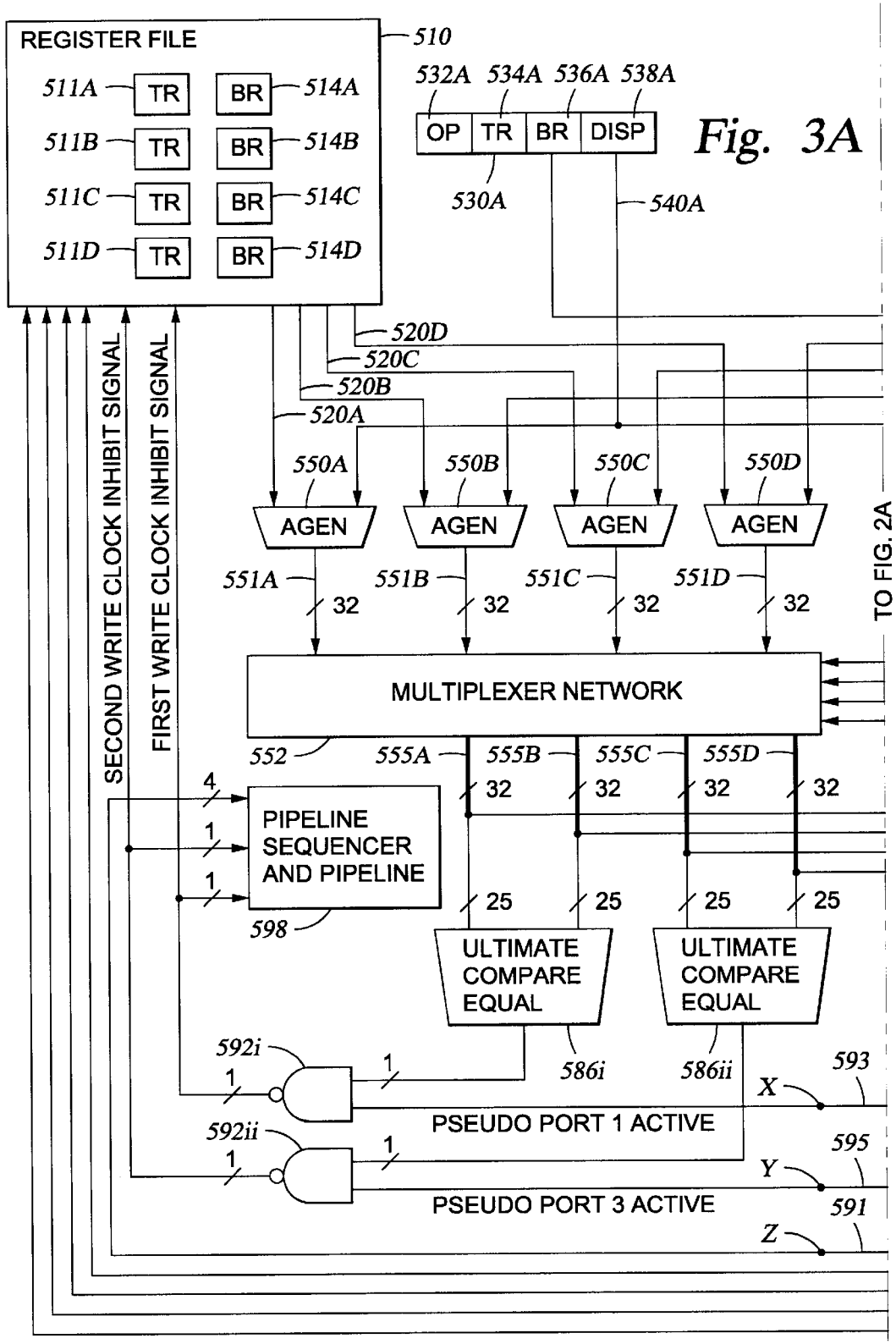
FIGS. 3A and 3B shows another embodiment including two data cache RAMs 512i & 512ii having two true ports port0 and port2, and two pseudo ports port1 and port3, respectively, and a controller 585.
Figure 3B:
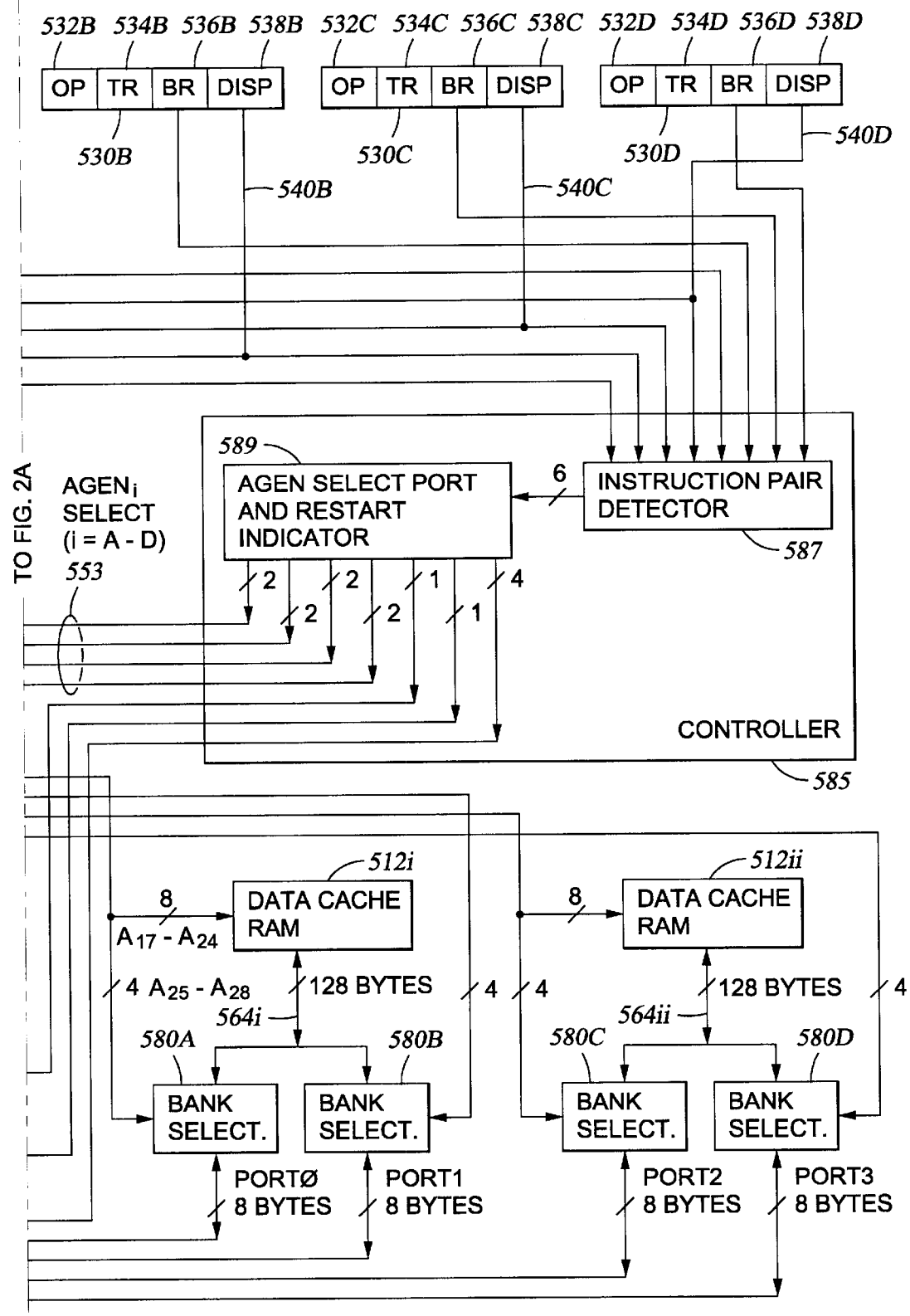

FIG. 3 shows another implementation of the data cache subsystem 110 of FIG. 1, according to an embodiment, with two data cache RAMs 512i & 512ii having two true ports port0 and port2, respectively, and two pseudo ports port1 and port3, respectively. These four ports help carry out up to four load instructions in parallel. Illustratively, a first, second, third, and fourth load instructions are fetched into instruction registers 530A, 530B, 530C, and 530D, in parallel. The first, second, third, and fourth load instructions have opcode fields 532A, 532B, 532C & 532D, target register fields 534A, 534B, 534C & 534D, base register fields 536A, 536B, 536C & 536D, and displacement fields 538A, 538B, 538C & 538D, respectively.

The execution of the first load instruction is discussed first. The opcode field 532A of the first load instruction specifies the operations which the processor 114 of FIG. 1 has to perform to load a first data from the main memory 118 (FIG. 1) to a register file 510. Register file 510 resides in the processor 114 of FIG. 1. The target register field 534A of the first load instruction specifies a first target register 511A in the register file 510 which will receive a first data to be loaded from the main memory 118 (FIG. 1). The base register field 536A of the first load instruction specifies a first base register 514A in the register file 510 whose content will be used to calculate a first address, in the memory 118 (FIG. 1), of the first data. The displacement field 538A of the first load instruction and the content of the first base register 514A are added by an AGEN (Address Generation) circuit 550A to generate the first address at output 551A of the AGEN 550A. The first address at output 551A, illustratively, has 32 bits $A_0$–$A_{31}$ in which $A_0$ is the most significant bit and $A_{31}$ is the least significant bit. The first address is applied to a Multiplexer Network 552.

Similarly, three other AGENs 550B, 550C, and 550C generate second, third, and fourth addresses at outputs 551B, 551C, and 551D, for the second, third, and fourth load instructions, respectively. The addresses at outputs 551B, 551C, and 551D are applied to Multiplexer Network 552. Multiplexer Network 552 has four outputs 555A, 555B, 555C, and 555D. The Multiplexer Network 552 connects each of the four outputs 551A, 551B, 551C, and 551C to one of the for outputs 555A, 555B, 555C, and 555D, depending on the four 2-bit control signals 553 including $AGEN_A$ Select, $AGEN_B$ Select, $AGEN_C$ Select, and $AGEN_D$ Select from a Controller circuit 585.

In an embodiment, as soon as the first, second, third, and fourth load instructions are fetched into the instruction registers 530A, 530B, 530C, and 530D, respectively, in parallel, the Controller circuit 585 receives inputs from the instruction registers and generates the four 2-bit select signals $AGEN_i$ Select (i=A–D), a Pseudo Port 1 Active bit, a Pseudo Port 3 Active bit, and four Instruction Refetch bits. The four 2-bit select signals $AGEN_i$ Select (i=A–D) cause the Multiplexer Network 552 to connect the outputs 551A, 551B, 551C, and 551D, respectively, to the outputs 555A, 555B, 555C, and 555D, not necessarily respectively. The Pseudo Port1 Active bit at an output 593 and the Pseudo Port3 Active at an output 595 of the Controller circuit 585 are applied as inputs to NAND gates 592i & 592ii, respectively. The Pseudo Port1 Active bit is HIGH if port1 is likely to hold correct data, and is LOW if port1 is likely to hold incorrect data. Similarly, the Pseudo Port3 Active bit at output 595 is HIGH if port3 is likely to hold correct data, and is LOW if port3 is likely to hold incorrect data. The four Instruction Refetch bits at an output 591 are applied to a Pipeline Sequencer & Restart 598. The four Instruction Refetch bits at output 591 of the Controller circuit 585 correspond to the first, second, third, and fourth instructions. Each of the four Instruction Refetch bits at output 591 indicates to the Pipeline Sequencer & Restart circuit 598 whether the corresponding load instruction should be refetched and re-execute.

In an embodiment, the Controller circuit 585 includes an Instruction Pair Detector circuit 587 and an AGEN Select Port & Restart Indicator circuit 589. The Instruction Pair Detector circuit 587 receives inputs from the instruction registers 530A, 530B, 530C, and 530D, and generate six 1-bit load-pair signals $LP_{AB}$, $LP_{AC}$, $LP_{AD}$, $PL_{BC}$, $LP_{BD}$, and $LP_{CD}$ to the AGEN Select Port & Restart Indicator circuit 589. Signal $LP_{AB}$ being LOW indicates that the first and second instructions will unlikely access a same data cache line of the data cache RAMs 512i & 512ii. Similarly, signal $LP_{AD}$ being LOW indicates that the first and fourth instructions will unlikely access a same data cache line of the data cache RAMs 512*i* & 512*ii*, and so on. The six signals LP$_{AB}$, LP$_{AC}$, LP$_{AD}$, PL$_{BC}$, LP$_{BD}$, and LP$_{CD}$ from the load pair detector 587 are applied to the AGEN Select Port & Restart Indicator circuit 589. The AGEN Select Port & Restart Indicator circuit 589 generates the four 2-bit select signals AGEN$_i$ Select (i=A–D), the Pseudo Port 1 Active bit, the Pseudo Port 3 Active bit, and the four Instruction Refetch bits.

Figure 4A:
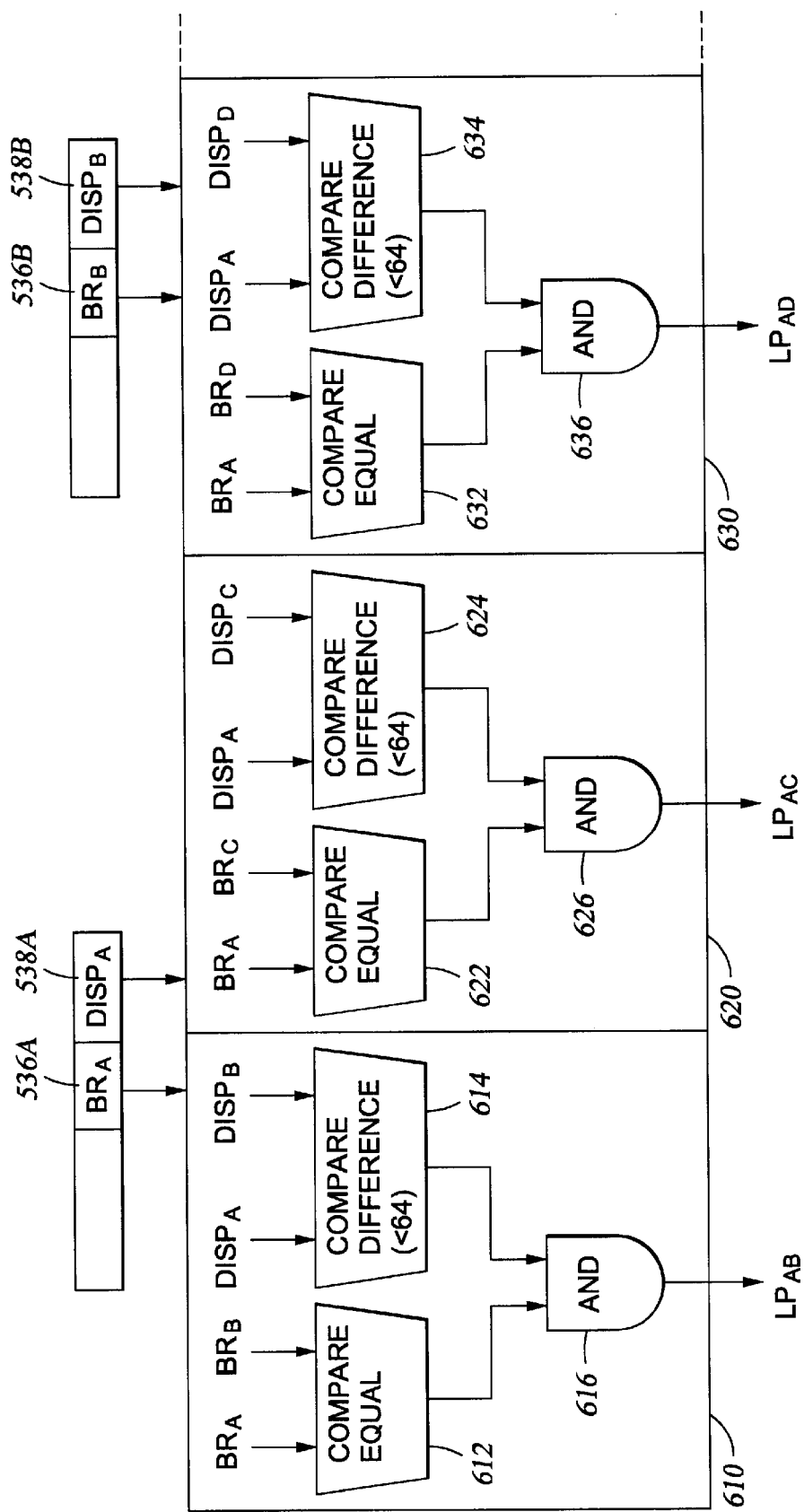
FIGS. 4A and 4B shows in detail an implementation of the instruction pair detector 587 of FIG. 3 according to an embodiment.
Figure 4B:
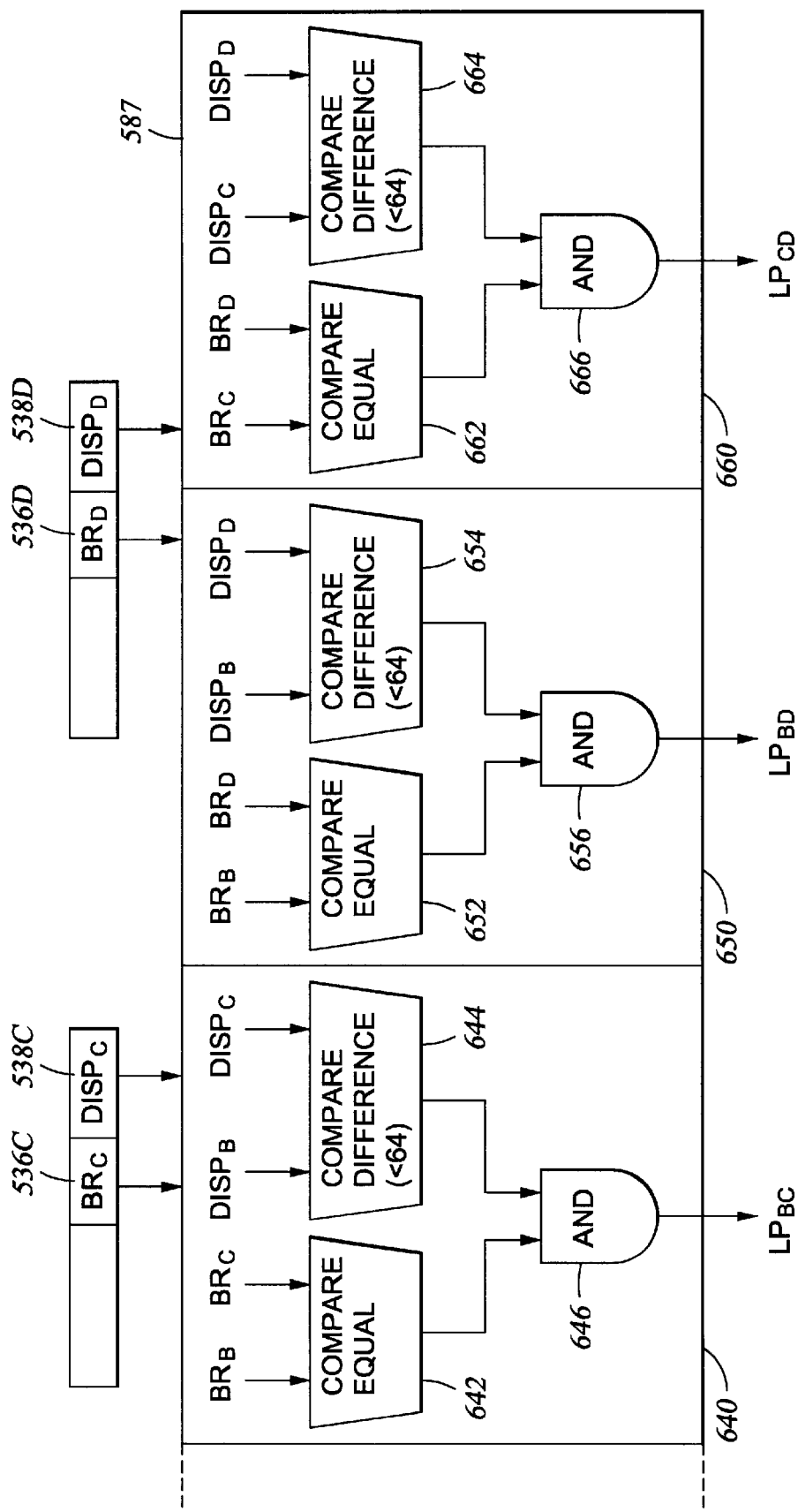

FIG. 4 shows in detail an implementation of the instruction pair detector 587 of FIG. 3 according to an embodiment. The load pair detector 587 includes six load pair testing circuits 610, 620, 630, 640, 650, and 660. The load pair testing circuits 610 tests the probability of the first and second load instructions not accessing the same cache line. In an embodiment, the load pair testing circuits 610 includes a Compare Equal circuit 612, a Compare Difference circuit 614, and an AND gate 616.

In an embodiment, the Compare Equal circuit 612 compares the base register field 536A of the first load instruction and the base register field 536B of the second load instruction. If they are equal, the Compare Equal circuit 612 generates a "1" (HIGH) signal to the AND gate 616. If they are not equal, the Compare Equal circuit 612 generates a "0" (LOW) signal to the AND gate 616. The output of the Compare Equal circuit 612 being LOW indicates that it is unlikely that the first and second load instructions will access a same data cache line. The Compare Difference circuit 614 compares the displacement field 538A of the first load instruction and the displacement field 538B of the second load instruction. If the difference is less than 64, the Compare Equal circuit 612 generates a "1" (HIGH) signal to the AND gate 616. If they are not, the Compare Equal circuit 612 generates a "0" (LOW) signal to the AND gate 616. The output of the Compare Difference circuit 614 being LOW indicates that it is unlikely that the first and second load instructions will access a same cache line. As a result, the output LP$_{AB}$ of the AND gate 616 being LOW indicates that it is unlikely that the first and second load instructions will access the same cache line.

Similarly, the load pair testing circuits 620 tests the probability of the first and third load instructions not accessing the same cache line. If the output signal LP$_{AC}$ of the AND gate 626 of the load pair testing circuits 620 is LOW, this indicates that it is unlikely that the first and third load instructions will access a same cache line. The structures and functions of the load pair testing circuits 620, 630, 640, 650, and 660 are similar to the load pair testing circuit 610.

The six load pair (LP) signals LP$_{AB}$, LP$_{AC}$, LP$_{AD}$, PL$_{BC}$, LP$_{BD}$, and LP$_{CD}$ from the load pair detector 587 are applied to the AGEN Select Port & Restart Indicator circuit 589 of FIG. 3. With reference to FIG. 3, the AGEN Select Port & Restart Indicator circuit 589 generates as outputs the four 2-bit select signals 553 including AGEN$_A$ Select, AGEN$_B$ Select, AGEN$_C$ Select, and AGEN$_D$ Select, corresponding to the first, second, third, and fourth addresses. The 2-bit select signals AGEN$_A$ Select, AGEN$_B$ Select, AGEN$_C$ Select, and AGEN$_D$ Select are applied to the Multiplexer Network 552 to route the first, second, third, and fourth addresses at the outputs 551A, 551B, 551C, and 551D, respectively, to the outputs 555A, 555B, 555C, and 555D, not necessarily respectively.

The AGEN Select Port & Restart Indicator circuit 589 also generates as outputs the two control signals Pseudo Port1 Active and Pseudo Port3 Active, which are applied as inputs to the NAND gates 592*i* & 592*ii*, respectively. The Pseudo Port1 Active signal is HIGH if port1 is likely to hold correct data, and is LOW if port1 is likely to hold incorrect data. Similarly, The Pseudo Port3 Active signal is HIGH if port3 is likely to hold good data, and is LOW if port3 is likely to hold incorrect data.

The AGEN Select Port & Restart Indicator circuit 589 also generates as outputs the 4 Instruction Refetch bits 591 which are applied to the Pipeline Sequencer & Restart 598. These 4 Instruction Refetch bits 591 indicate to Pipeline Sequencer & Restart circuit 598 which load instructions need to be refetched and re-execute.

FIG. 5 shows a truth table for an implementation of the AGEN Select Port & Restart Circuit 589 of FIG. 3, according to an embodiment. With reference to the first line of the table of FIG. 5 in view of FIG. 3, all input signals LP$_{AB}$, LP$_{AC}$, LP$_{AD}$, PL$_{BC}$, LP$_{BD}$, and LP$_{CD}$ from the load pair detector 587 (shown in FIG. 4) are LOW. This indicates that it is likely that no two load instructions will access the same cache line. As a result, a port assignment can be as follows. The first address at output 551A corresponding the first instruction is assigned to the true port0. Accordingly, an entry of "00", representing port0, is entered under output control signal "AGEN$_A$ Select" in the table. The second address at output 551B corresponding the second instruction is assigned to the true port2. Accordingly, an entry of "10", representing port2, is entered under output control signal "AGEN$_B$ Select" in the table. This means that the first and second load instructions are chosen to be executed now. The third and fourth load instructions must be refetched and re-execute. The third and fourth addresses at outputs 551C & 551D, respectively, can be assigned in any way to the remaining two pseudo port1 and port3, provided that the assignment must be one-to-one. One choice can be that the third address at output 551C is assigned to port1 and the fourth address at output 551D is assigned to port3. Accordingly, entries of "01" and "11", representing port1 & port3, are entered under output control signal "AGEN$_C$ Select" and "AGEN$_D$ Select" in the table, respectively.

Because it is likely that port1 and port3 will hold the incorrect data, the output signals Pseudo Port1 Active and Pseudo Port3 Active should be "00" so as to make the outputs of the NAND gates 592*i* & 592*ii* go LOW. This in turn signals the register file 510 not to use the data from pseudo port1 and port3. Because the third and fourth load instructions are chosen to be refetched and re-execute, an entry of "0011" is entered under the "Instruction Refetch". The decimal number(s) in parentheses indicate which load instruction(s) is to be refetched. The outputs of the NAND gates 592*i* & 592*ii* being LOW also trigger the Pipeline Sequencer & Restart circuit 598 to refetch and reexecute the load instructions specified by the Instruction Refetch bits (i.e., the third and fourth load instructions).

With reference to the second line of the table of FIG. 5 in view of FIG. 3, only input signal LP$_{AD}$ from the load pair detector 587 (detail in FIG. 4) is HIGH. This indicates that it is likely that the first and fourth load instructions will access the same cache line. As a result, a port assignment can be as follow. The first address at output 551A corresponding the first load instruction is assigned to the true port0. Accordingly, an entry of "00", representing port0, is entered under output control signal "AGEN$_A$ Select" in the table. The fourth address 551D corresponding the fourth load instruction is assigned to the pseudo port1. Accordingly, an entry of "01", representing port1, is entered under output control signal "AGEN$_D$ Select" in the table. The second address at output 551B corresponding the second load instruction can be assigned to the true port2. Accordingly, an entry of "10", representing port2, is entered under output control signal "AGEN$_B$ Select" in the table. This means that the second load instruction is chosen over the third load instruction to be executed now. The third load instruction is chosen to be refetched and re-execute. As a result, the third address at output 551C corresponding the third load instruction can be assigned to the pseudo port3. Accordingly, an entry of "11", representing port3, is entered under output control signal "AGEN$_C$ Select" in the table.

Because it is likely that pseudo port3 will hold the incorrect data, the output signals Pseudo Port1 Active and Pseudo Port1 Active should be "10" so as to make the output of the NAND gate 592$ii$ go LOW. This in turn signals the register file 510 not to use the data from pseudo port3. Because the third load instruction is chosen to be refetched and re-execute, an entry of "0010" is entered under the "Instruction Refetch". The outputs of the NAND gates 592$ii$ being LOW also triggers the Pipeline Sequencer & Restart circuit 598 to refetch and reexecute the load instruction specified by the Instruction Refetch bits (i.e., the third load instruction).

The truth table of FIG. 5 should have enough lines to accommodate all possible combinations of the six input signals LP$_{AB}$, LP$_{AC}$, LP$_{AD}$, PL$_{BC}$, LP$_{BD}$, and LP$_{CD}$ from the load pair detector 587 ($2^6$=64 lines). From this truth table, the AGEN Select Port & Restart Indicator circuit 589 (FIG. 3) can be built.

Figure 6A:
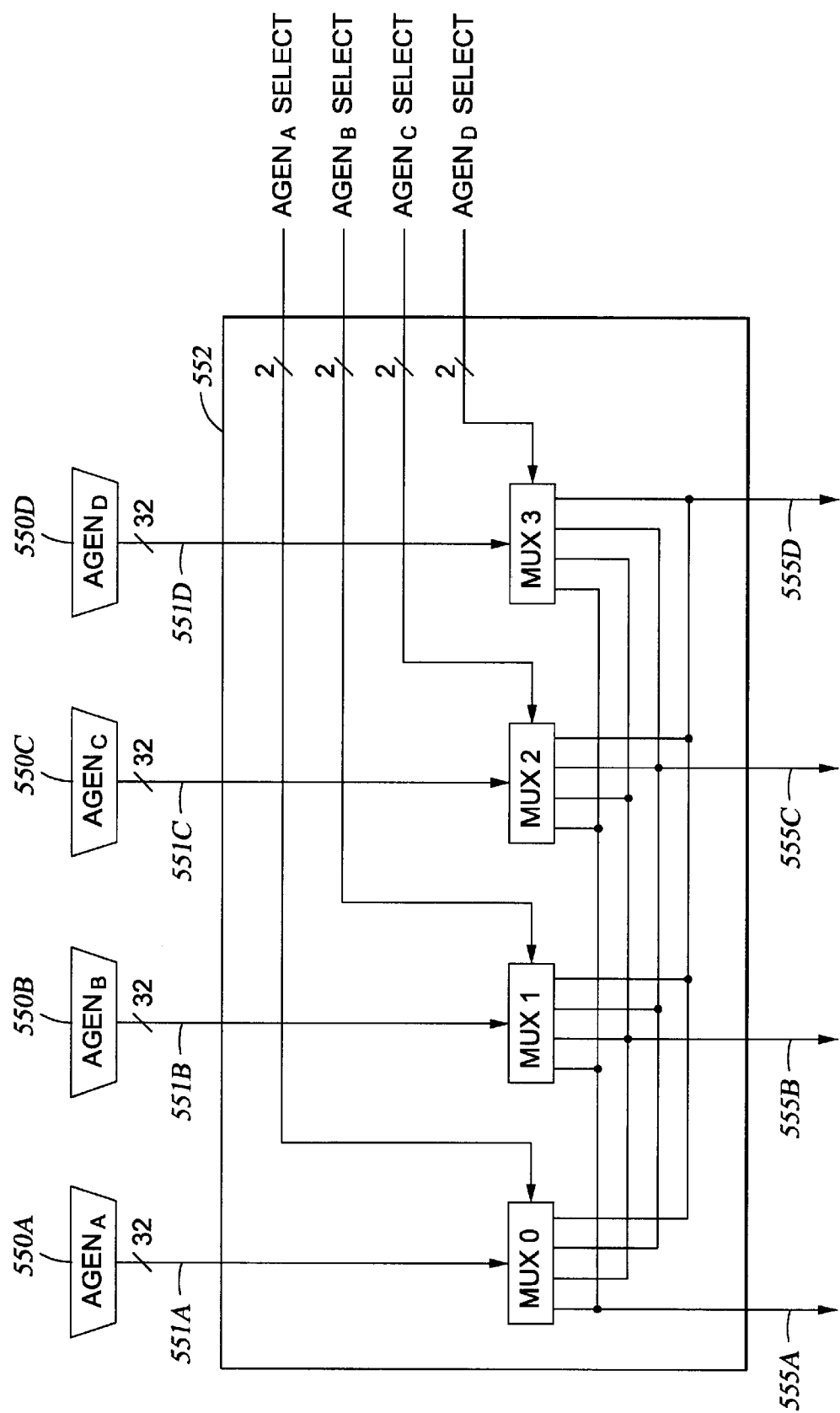
FIG. 6A shows an implementation of the Multiplexer Network 552 of FIG. 3 according to an embodiment.

FIG. 6A shows an implementation of the Multiplexer Network 552 of FIG. 3 according to an embodiment. The Multiplexer Network 552 includes four multiplexers MUX0, MUX1, MUX2, and MUX3. MUX0 receives as its input the first address at output 551A generated by AGEN 550A. MUX0's outputs connect to all four outputs 555A, 555B, 555C, and 555D of the Multiplexer Network 552. However, the 2-bit AGEN$_A$ Select signal causes MUX0 to electrically connect its input 551A to one of the four outputs 555A, 555B, 555C, and 555D. MUX1, MUX2, and MUX3 have a similar structure and functions to that of MUX0.

Figure 6B:
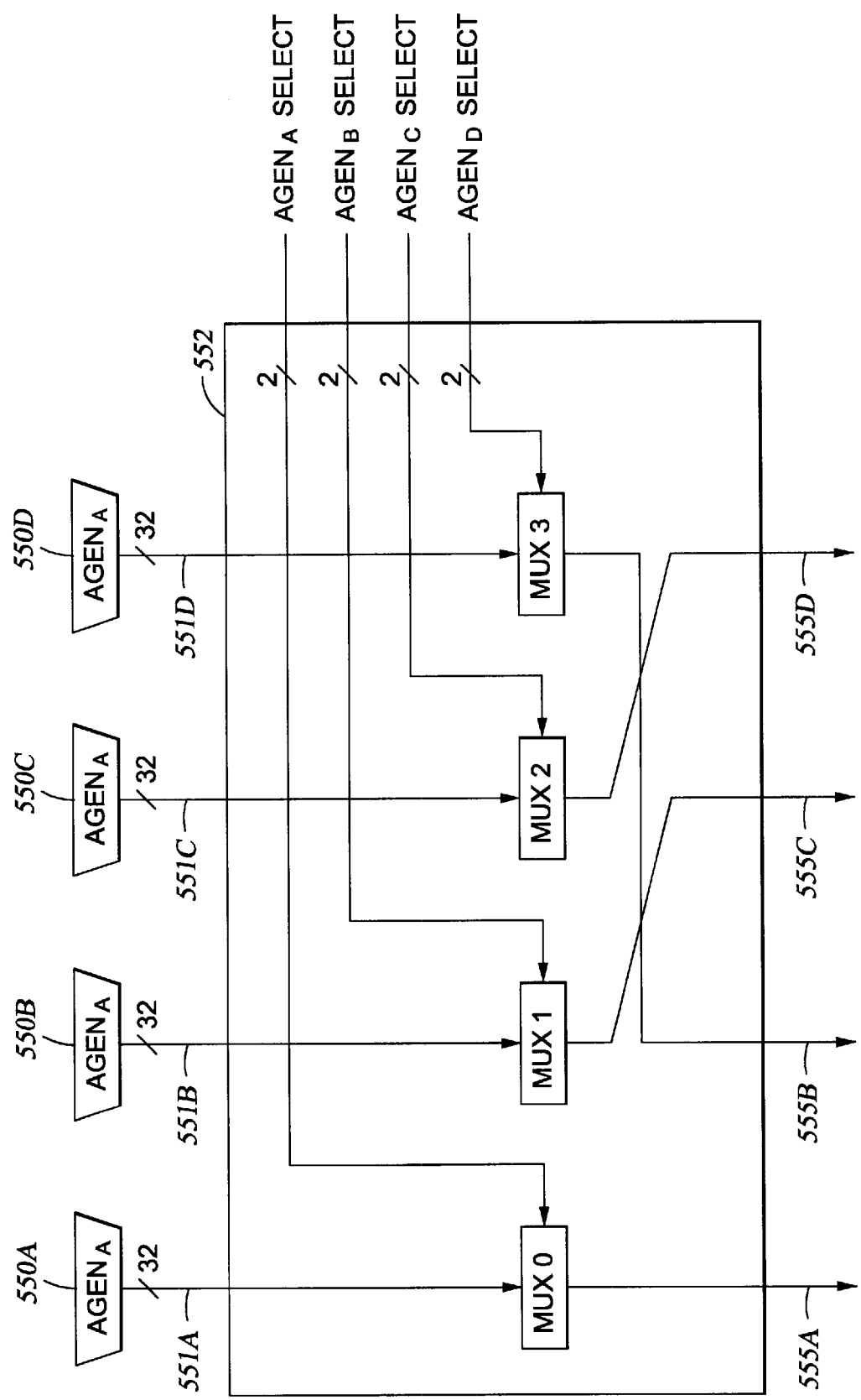
FIG. 6B shows the connections inside the Multiplexer Network 552 of FIG. 3 corresponding to a particular value of the select signals AGEN$_i$ Select (i=A–D)

Suppose the second line of the truth table of FIG. 5 is applicable. The AGEN$_A$ Select signal being "00" causes MUX0 to electrically route the first address at output 551A generated by AGEN 550A to output 555A, which corresponds to port0. The AGEN$_B$ Select signal being "10" causes MUX1 to connect the second address at output 551B generated by AGEN 550B to output 555C, which corresponds to port2. The AGEN$_C$ Select signal being "11" causes MUX2 to connect the third address at output 551C generated by AGEN 550C to output 555D, which corresponds to port3. The AGEN$_D$ Select signal being "01" causes MUX3 to connect the fourth address at output 551D generated by AGEN 550D to output 555B, which corresponds to port1. FIG. 6B shows the resultant connections.

As a result, ultimately, the first address at output 555A will be used to access a first data cache line in data cache RAM 512$i$ and to select a first bank from the first data cache line which is outputted to port0. The fourth address at output 555B will be used to select a second bank from the first data cache line which is outputted to port1. The functions of the data cache RAM 512$i$, bank selectors 580A & 580B are similar to those of the data cache RAM 412, bank selectors 480A & 480B of FIG. 2.

Similarly, ultimately, the second address at output 555C will be used to access a second data cache line in data cache RAM 512$ii$ and to select a third bank from the second data cache line which is outputted to port2. The third address at output 555D will be used to select a fourth bank from the second cache line in data cache RAM 512$ii$ which is outputted to port3. The functions of the data cache RAM 512$ii$, bank selectors 580C & 580D are similar to those of the data cache RAM 412, bank selectors 480A & 480B of FIG. 2.

The function of the load pair detector 587 and the AGEN Select Port & Restart Indicator circuit 589 is to detect high probability of pairs of load instructions accessing or not accessing a same cache line. The fact that the output signal Pseudo Port1 Active of the AGEN Select Port & Restart Indicator circuit 589 is HIGH, as in the second line of the truth table of FIG. 5, indicates only that it is likely that the data at pseudo port1 is correct. There is still a small probability that the data at pseudo port1 is incorrect. Therefore, Ultimate Compare Equal circuits 586$i$ & 586$ii$ are used to ultimately check the validity of the data at pseudo port1 and port3.

Ultimate Compare Equal circuit 586$i$ receives as its two inputs 25 most significant bits of the outputs 555A & 555B (i.e., A$_0$–A$_{24}$) and generates a "1" (HIGH) signal if its two inputs are equal, and a "0" (LOW) signal if its two inputs are not equal. The output of Ultimate Compare Equal circuit 586$i$ goes to a NAND gate 592$i$ whose output goes to register file 510 as a first Write Clock Inhibit signal and to the Pipeline Sequencer & Restart circuit 598. If the two inputs of Ultimate Compare Equal circuit 586$i$ are not equal, indicating the data output at port1 is not correct, the output of Ultimate Compare Equal circuit 586$i$ is "0", causing the output of the NAND gate 592$i$ to become "1". As a result, the first Write Clock Inhibit signal becomes active preventing the register file 510 from going further with the incorrect data at port1. The output of the NAND gate 592$i$ going "1" also triggers the Pipeline Sequencer & Restart circuit 598 to restart fetching and executing the load instruction whose address was routed to output 555B.

Similarly, Ultimate Compare Equal circuit 586$ii$ receives as its two inputs 25 most significant bits of the outputs 555C & 555D (i.e., A$_0$–A$_{24}$) and outputs a "1" signal if its two inputs are equal, and a "0" signal if its two inputs are not equal. The output of Ultimate Compare Equal circuit 586$ii$ goes to a NAND gate 592$ii$ whose output goes to register file 510 as a second Write Clock Inhibit signal and to a Pipeline Sequencer & Restart circuit 598. If the two inputs of Ultimate Compare Equal circuit 586$ii$ are not equal, indicating the data output at port3 is not correct, the output of Ultimate Compare Equal circuit 586$ii$ is "0", causing the output of the NAND gate 592$ii$ to become "1". As a result, the second Write Clock Inhibit signal becomes active preventing the register file 510 from going further with the incorrect data at port3. The output of the NAND gate 592$ii$ going "1" also triggers the Pipeline Sequencer & Restart circuit 598 to restart fetching and executing the load instruction whose address was routed to output 555D.

The select signals 553 coming from Controller circuit 585 to the Multiplexer Network 552 are generated before the first, second, third, and fourth addresses at outputs 551A, 551B, 551C, and 551D, respectively, are generated. This is because it takes longer to access the register file 510 to obtain the contents of the base registers 514A, 514B, 514C, and 514D, respectively, specified by the base register fields 436A, 436B, 436C, and 436D, which are needed to generate the first, second, third, and fourth addresses at outputs 551A, 551B, 551C, and 551D, respectively. Therefore, when the first, second, third, and fourth addresses appear at the outputs 551A, 551B, 551C, and 551D, respectively, the four 2-bit select signals AGEN$_A$ Select, AGEN$_B$ Select, AGEN$_C$ Select, and AGEN$_D$ Select have been applied to the Multiplexer Network 552 to route the first, second, third, and fourth addresses, respectively, to the outputs 555A, 555B, 555C, and 555D, not necessarily respectively.

Figure 7:
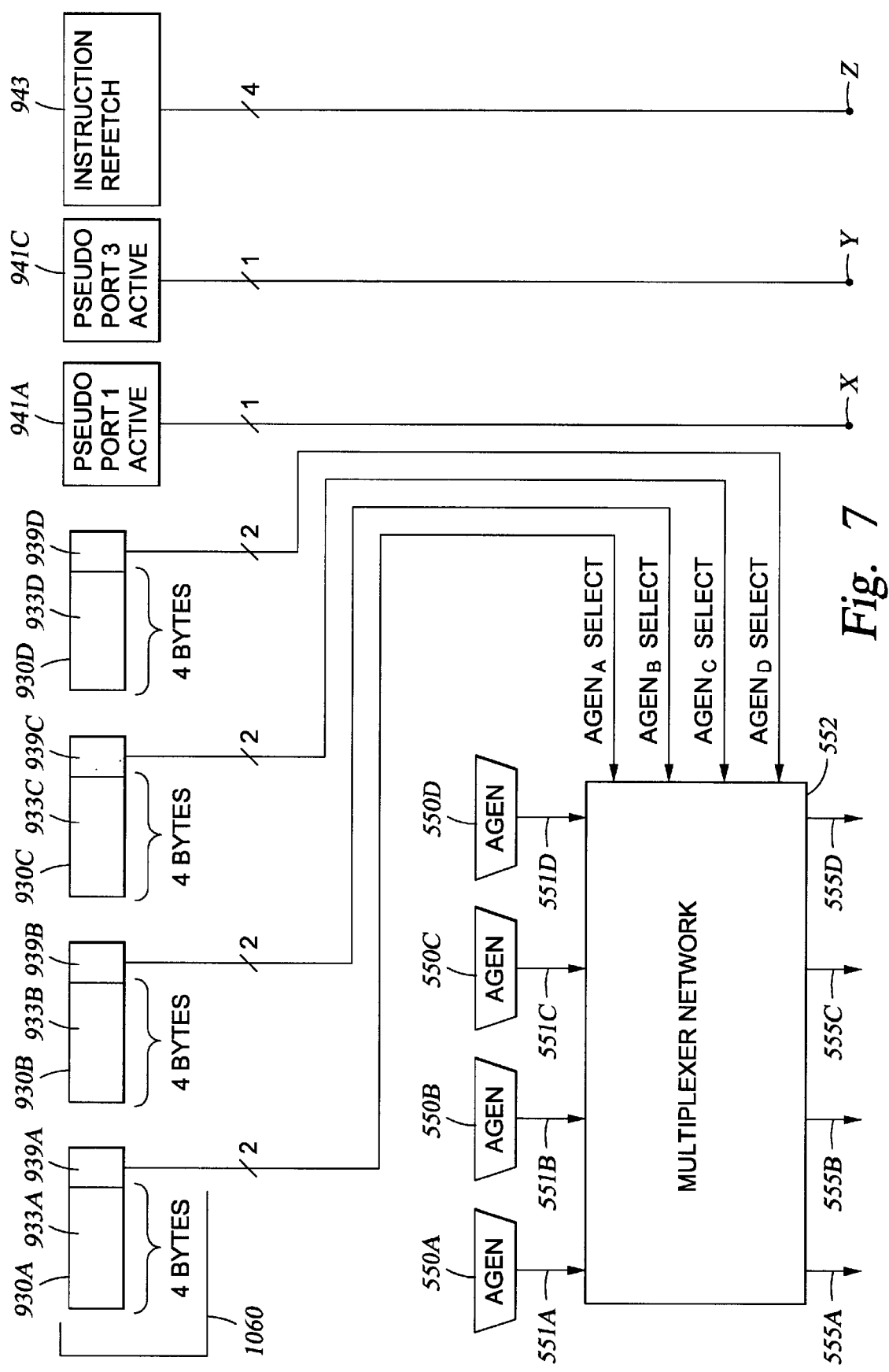
FIG. 7 shows yet another embodiment in which the functions of the Controller 585 of FIG. 3 are performed during the reloading of an instruction cache 1050 (FIG. 8).
Figure 8:
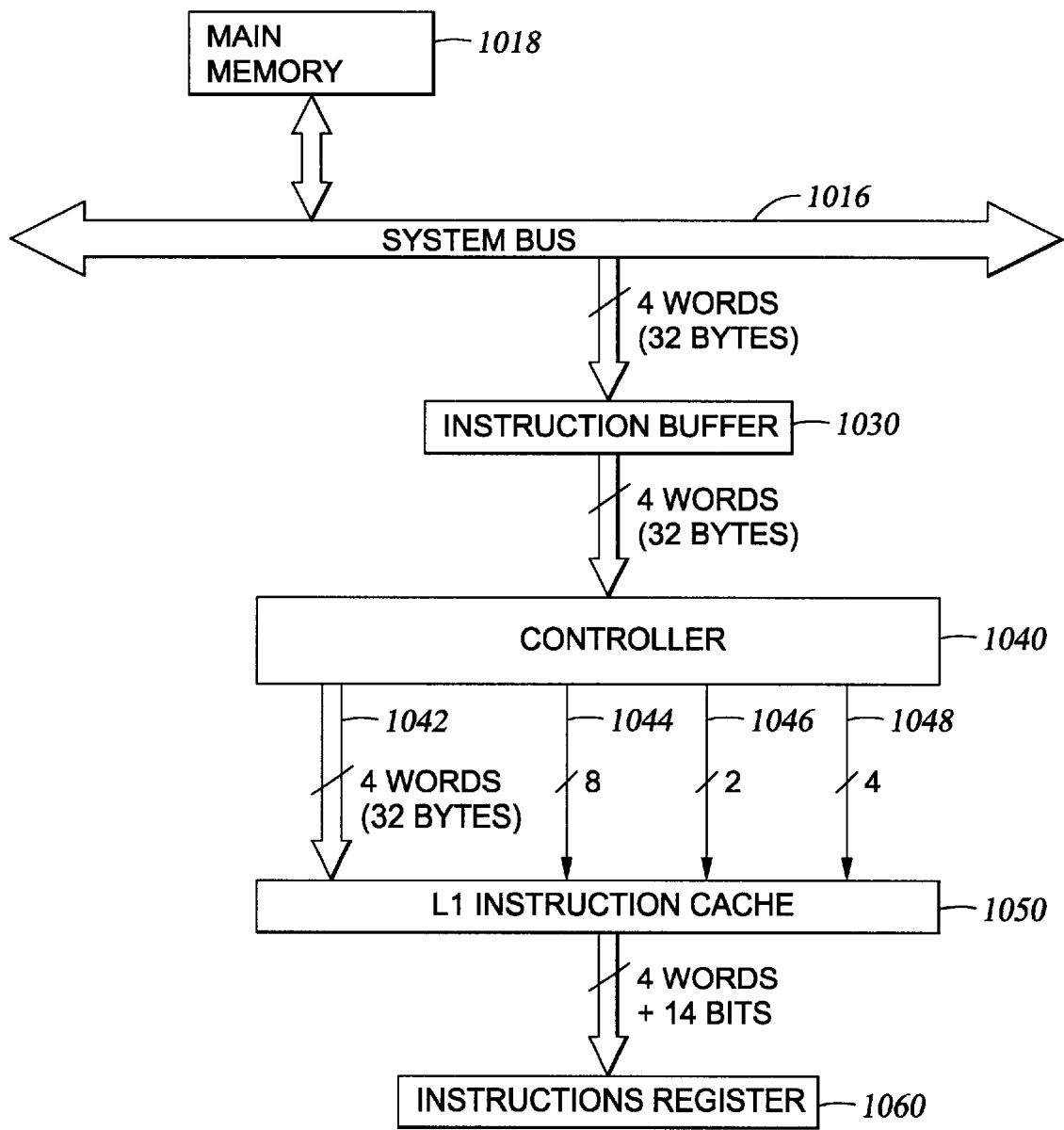
FIG. 8 shows an implementation of the controller 585 of FIG. 3 during the reloading of the instruction cache 1050.

In another embodiment, it may be desirable to perform the functions of the Controller 585 during reloading of an L1 instruction cache instead of during run time, as in FIG. 3. FIG. 7 shows an embodiment in which the functions of the Controller 585 of FIG. 3 are performed during the reloading of an instruction cache 1050 (FIG. 8). For simplicity, FIG. 7 shows only part of FIG. 3. FIG. 8 shows an implementation of the controller 585 of FIG. 3 during the reloading of the instruction cache 1050 according to an embodiment. With reference to both FIGS. 7 & 8, it is assumed, for purposes of illustration, that a first, second, third, and fourth load instructions are reloaded in parallel from a main memory 1018 via a system bus 1016 to an instruction buffer 1030. The first, second, third, and fourth load instructions are then sent to a Controller 1040 which, in addition to passing the four load instructions to the L1 instruction cache 1050 via an output 1042, performs the functions of the Controller 585 of FIG. 3, but before run time. More specifically, the Controller 1040 receives inputs from the base register fields and the displacement fields of the four load instructions and generates as its outputs an 8-it signal at an output 1044 corresponding to the four 2-bit select signals $AGEN_A$ Select, $AGEN_B$ Select, $AGEN_C$ Select, and $AGEN_D$ Select of FIG. 3. The Controller circuit 1040 also generates a 2-bit signal at an output 1046 corresponding to the Pseudo Port1 Active signal and the Pseudo Port3 Active signal at outputs 593 & 595, respectively, in FIG. 3. The Controller circuit 1040 also generates a 4-bit signal at an output 1048 corresponding to the 4 Instruction Refetch bits at output 591 of FIG. 3. All the signals at the outputs 1042, 1044, 1046, and 1048 of the Controller circuit 1040 are reloaded to the L1 Instruction Cache 1050, and then passed to an instructions register 1060. The detailed format of the instructions register 1060 is shown at top of FIG. 7. The first, second, third, and fourth load instructions (illustratively, each is one word or 4 Bytes long) occupy fields 933A, 933B, 933C, and 933D, respectively, of the instructions register 1060. The four 2-bit select signals $AGEN_A$ Select, $AGEN_B$ Select, $AGEN_C$ Select, and $AGEN_D$ Select occupy fields 939A, 939B, 939C, and 939D, respectively, of the instructions register 1060, which are applied to the Multiplexer Network 552. The Pseudo Port1 Active signal and the Pseudo Port3 Active signal occupy fields 941A & 941C, respectively, of the instructions register 1060, which are connected to points X & Y, respectively, of FIG. 3. The four Instruction Refetch bits from output 1048 (FIG. 8) occupy fields 943 of the instructions register 1060, which is connected to point Z of FIG. 3.

As a result, when the four load instructions are fetched into the instructions register 1060, the select signals $AGEN_A$ Select, $AGEN_B$ Select, $AGEN_C$ Select, and $AGEN_D$ Select are immediately present to route the first, second, third, and fourth addresses at outputs 551A, 551B, 551C, and 551D, generated by AGEN 550A, 550B, 550C, and 550D, respectively, to the outputs 555A, 555B, 555C, and 555D of Multiplexer Network 552, not necessarily respectively. Also, the refetch of instructions that cannot be executed now can start immediately because all the necessary information regarding, for instance, which instructions should be refetched is available in the instructions register 1060. The ensuing operations of the multiplexer network 552 and other components of FIG. 3 have been described above with reference to FIGS. 3, 4, 5, and 6A & 6B.

While the foregoing is directed to embodiments of the present invention, other and further embodiments of the invention may be devised without departing from the basic scope thereof, and the scope thereof is determined by the claims that follow.

What is claimed is:

1. A data cache subsystem for providing data corresponding to a first and a second addresses associated with first and second instructions in parallel, the data cache subsystem comprising:

a data cache RAM including a plurality of data cache lines each having a plurality of data banks, wherein the data cache RAM is configured to output a data cache line selected by the first address;

a bank selector circuit coupled to the data cache RAM to receive the data cache line selected by the first address, output a first data bank selected by the first address from the selected data cache line on a true port, and output a second data bank selected by the second address from the selected data cache line on a pseudo port; and an instruction pair testing circuit to generate a non-pair signal indicative of the validity of the second data bank for use with the second instruction based on the probability of the first and second addresses accessing a same data cache line.

2. The data cache subsystem of claim 1 further comprising:

a register file coupled to the bank selector circuit and configured receive the first and second data banks from the bank selector circuit; and wherein the instruction pair testing circuit comprises an Ultimate Compare Equal circuit coupled to the register file, wherein the Ultimate Compare Equal circuit is configured to receive and compare at least a portion of the first and second addresses to check if the first and second addresses access the same data cache line of the data cache RAM, and if not, generate the non-pair signal to the register file causing the register file not to use the second data bank from the bank selector circuit.

3. The data cache subsystem of claim 2 further comprising:

a Pipeline Sequencer & Restart circuit coupled to the Ultimate Compare Equal circuit, wherein the Pipeline Sequencer & Restart circuit is configured to refetch a non-pair instruction that generates the second address in response to the non-pair signal.

4. The data cache subsystem of claim 1 further comprising:

a Multiplexer Network coupled to the data cache RAM and the bank selector circuit; and an Address Generation circuit coupled to the Multiplexer Network and configured to generate the first and second addresses based on fields of the first and second instructions and wherein the Multiplexer Network is configured to route the first and second addresses to the data cache RAM and the bank selector circuit.

5. The data cache subsystem of claim 4 further comprising:

a Controller circuit coupled to the Multiplexer Network and configured to receive and compare a plurality of instructions including the first and second instructions to determine if the first and second addresses will likely access a same data cache line and, if the first and second addresses will likely access the same data cache line of the data cache RAM, cause the Multiplexer Network to route the first and second addresses to the data cache RAM and the bank selector circuit.

6. The data cache subsystem of claim 5 wherein the Controller circuit is further configured to generate control signals indicating whether one of the first and second instructions corresponding to the second address should be refetched.

7. The data cache subsystem of claim 5 further comprising an instruction register coupled to the Address Generation circuit and the Controller circuit, wherein the Controller circuit is configured to receive the plurality of instructions from the instruction register.

8. The data cache subsystem of claim 5 further comprising an instruction register coupling the Controller circuit to the Multiplexer Network, wherein the Controller circuit is configured to send the plurality of instructions and a plurality of control signals to the instruction register; and the instruction register is configured to forward at least a portion of the control signals to the Multiplexer Network causing the Multiplexer Network to route the third and fourth first and second addresses to the data cache RAM and the bank selector circuit.

9. A method of retrieving data from a data cache RAM corresponding to a first and second addresses in parallel the method comprising:

using the first address to select a data cache line of the data cache RAM;

outputting with a bank selector circuit a first data bank selected by the first address from the data cache line;

outputting with the bank selector circuit a second data bank selected by the second address from the data cache line;

determining if the first and second addresses access the same cache line; and if not, generating a non-pair signal indicating the second data bank is invalid for use with an instruction associated with the second address.

10. The method of claim 9 further comprising:

sending the first and second data banks to a file register;

comparing, with an Ultimate Compare Equal circuit, at least a portion of the first and second addresses to check whether the first and second addresses access a same data cache line of the data cache RAM, and if not, generating with the Ultimate Compare Equal circuit the non-pair signal to the register file causing the register file not to use the second data bank from the bank selector circuit.

11. The method of claim 10 further comprising:

refetching with a Pipeline Sequencer & Restart circuit a non-pair instruction that generates the second address whenever the Ultimate Compare Equal circuit generates the non-pair signal.

12. The method of claim 9 further comprising:

generating with an Address Generation circuit a third and fourth addresses corresponding to first and second instructions, respectively, to a Multiplexer Network; and routing with the Multiplexer Network the third and fourth addresses to the data cache RAM and the bank selector circuit as the first and second addresses.

13. The method of claim 12 further comprising;

receiving and comparing with a Controller circuit a plurality of instructions including the first and second instructions; and if the third and fourth addresses will likely access a same data cache line of the data cache RAM, the Controller circuit causing the Multiplexer Network to route the third and fourth addresses to the data cache RAM and the bank selector circuit as the first and second addresses.

14. The method of claim 13 further comprising generating with the Controller circuit control signals indicating whether the first and second addresses will likely access a same data cache line of the data cache RAM and that whether one of the first and second instructions corresponding to the second address should be refetched.

15. The method of claim 13 wherein the step of the Controller circuit receiving the plurality of instructions comprises receiving with the Controller circuit the plurality of instructions from an instruction register.

16. The method of claim 13 further comprising:

sending with the Controller circuit the plurality of instructions and control signals to an instruction register; and forwarding with the instruction register at least a portion of the control signals to the Multiplexer Network causing the Multiplexer Network to route the third and fourth addresses to the data cache RAM and the bank selector circuit as the first and second addresses.

17. A cache system for simultaneously providing data for use in processing first and second instructions involving first and second addresses, respectively, the cache system comprising:

bank selection circuitry configured to receive a cache line selected based solely on the first address and to select, from the selected cache line, a first bank of data based on the first address and a second bank of data based on the second address;

a true port for supplying the first bank of data;

a pseudo port for supplying the second bank of data; and detection circuitry for providing a signal indicative of the validity of the second bank of data for use in processing the second instruction, based on the likelihood of the first and second addresses both accessing the selected cache line.

18. The cache system of claim 17 wherein:

the detection circuitry comprises comparison circuitry for comparing a base register field of the first and second instructions.

19. The cache system of claim 17, wherein the bank selection circuitry comprises multiplexors to selectively provide banks of data from the selected cache line to the true port and pseudo port.

20. The cache system of claim 19, comprising at least four ports including the true port and at least two pseudo ports.

* * * * *